United States Patent
Vieira Da Silva

[19]

[11] Patent Number: 5,976,591
[45] Date of Patent: Nov. 2, 1999

[54] METHOD FOR COOKING A FOOD SUCH AS A WHOLE FOIE GRAS OR A FISH

[76] Inventor: Jorge Vieira Da Silva, 25, avenue de Wagram, 75017-Paris, France

[21] Appl. No.: 08/945,286
[22] PCT Filed: Apr. 12, 1996
[86] PCT No.: PCT/FR96/00554

§ 371 Date: Oct. 17, 1997

§ 102(e) Date: Oct. 17, 1997

[87] PCT Pub. No.: WO96/32853

PCT Pub. Date: Oct. 24, 1996

[30] Foreign Application Priority Data

Apr. 18, 1995 [FR] France .................................. 95/04587

[51] Int. Cl.$^6$ ....................................................... A23L 1/00
[52] U.S. Cl. ........................... 426/233; 426/509; 426/523
[58] Field of Search .................................... 426/231, 233, 426/509, 523; 165/10

[56] References Cited

U.S. PATENT DOCUMENTS

| | | | |
|---|---|---|---|
| 2,787,549 | 4/1957 | Heald | 426/509 |
| 4,331,127 | 5/1982 | Grosso | 126/377 |

FOREIGN PATENT DOCUMENTS

| | | |
|---|---|---|
| 2 595 916-A1 | 9/1987 | France . |
| 2 619 680-A1 | 3/1989 | France . |
| 88 14 507 U | 1/1989 | Germany . |
| 2 049 400 | 12/1980 | United Kingdom . |

*Primary Examiner*—George C. Yeung
*Attorney, Agent, or Firm*—Frohwitter; R. William Beard, Jr.

[57] ABSTRACT

A method of cooking food comprising the steps of a) i) measuring the mass of the food and placing the mass in a first receptacle (10) forming a container; or ii) placing the food in a first receptacle and measuring the combined mass of the food plus the first receptacle; or iii) measuring the mass of the food; b) placing the food, optionally together with the first receptacle of step a) in a second receptacle (16); c) raising a liquid such as water to a predetermined temperature, and in particular boiling temperature; d) as a function of a pre-established relationship between the mass of the food, or between the combined mass of the food plus the first receptacle, and the desired mean cooking temperature, determining a quantity of the water at predetermined temperature; e) placing the quantity of water inside the second receptacle, in thermal contact with the first receptacle; and f) cooking the food for a predetermined length of time, wherein the food is cooked by heat transfer between the water, the first receptacle and the food.

18 Claims, 1 Drawing Sheet

FIG_1
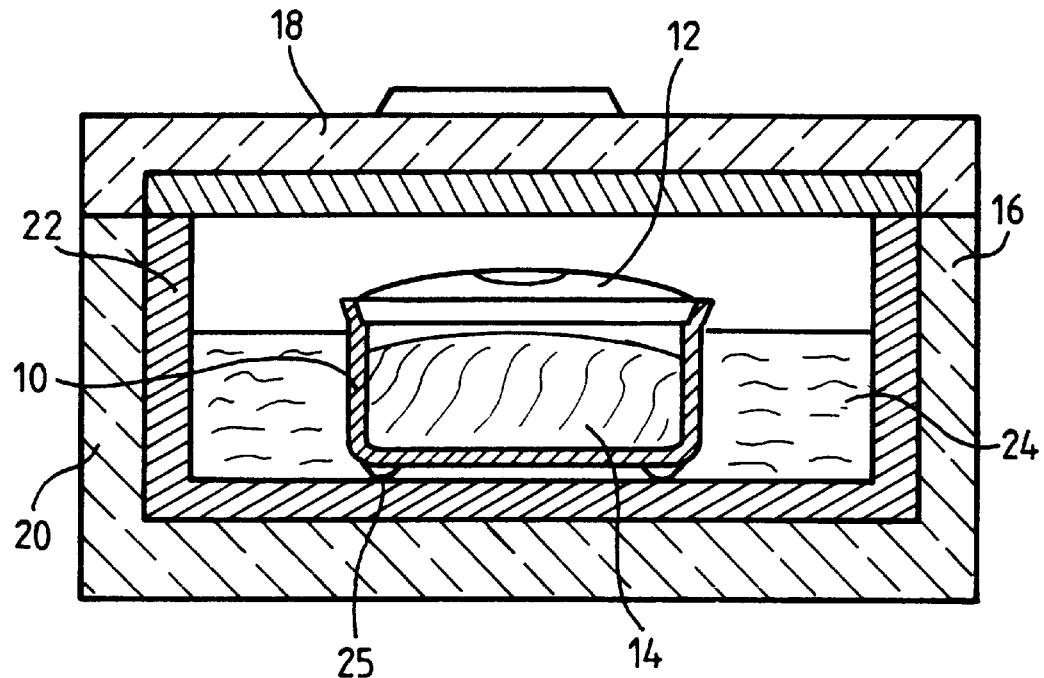
FIG_2
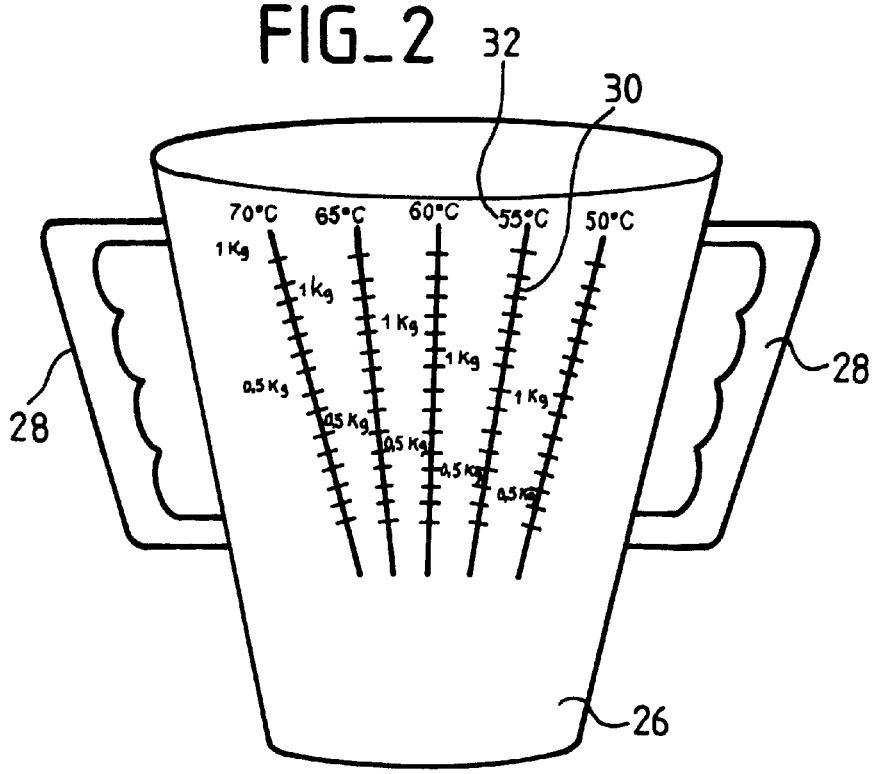

METHOD FOR COOKING A FOOD SUCH AS A WHOLE FOIE GRAS OR A FISH

The invention relates to cooking food at low temperature (of the order of 50° C. to 80° C.), and more particularly cooking foie gras and fish. The invention also relates, when cooking frozen food, to controlling the thawing, heating, cooking sequence.

In the particular case of foie gras, preparation can be performed in various ways, depending on temperature and on length of cooking time: lightly cooked, part-cooked, or for potting. These various degrees of cooking lead to different taste qualities and different keeping properties.

Although it is relatively easy to make potted foie gras at home by cooking it through to the center at a high temperature (greater than 110° C., thereby sterilizing it), it is much more difficult to obtain a part-cooked foie gras having satisfactory taste qualities. It is necessary not only to avoid insufficient cooking that fails to penetrate to the center of the liver (where part-cooked foie gras is generally prepared by cooking whole livers or at least a large volume of liver, e.g. in a pot), and also to avoid excessive cooking which would degrade the aroma, the savor, and the bouquet that make this dish attractive.

Consumer interest in part-cooked foie gras is increasing, given its exceptional taste qualities providing it has been properly prepared.

This difficult preparation can be mastered in satisfactory manner on an industrial scale or on a craft scale, and part-cooked foie gras are readily available on sale in jars, in cans, or in vacuum packaging.

Nevertheless, it is much more difficult to control preparation of part-cooked foie gras at home, there being a large empirical content in such preparation with a corresponding risk of failure or of poor control over the qualities of the final dish. Preparation is usually performed by cooking in a pot that is placed in an oven or in a bain-marie in an oven, but because of the considerable temperature gradient, cooking is particularly difficult to control and achieve in uniform and reproducible manner, giving rise in particular to the risk of the liver being overcooked on the outside or even right through.

Given the present enthusiasm for home preparation and the ever-increasing availability of raw livers on the market, a need has arisen for making it easy and reliable to provide pots of "part-cooked" foie gras, i.e. preparations that are not suitable for preserving, at temperatures lying essentially in the range 50° C. to 75° C., and capable of being implemented by the general public (or indeed by professionals) without requiring special skill or experience and in a manner that is reliable, simple, and nevertheless completely under control.

Turning now to fish, although fish can be cooked at high temperature without damaging its nutritional or taste qualities, numerous recipes, and in particular those based on interchange with a cooking medium such as a stock, are better performed at low temperature, not exceeding 95° C. (like steam cooking). It is known that cooking fish at below the boiling temperature of water conserves all of the properties of this food. A known recipe consists in plunging a fish into hot stock, turning off the heat, and alloying it to cook merely by exchanging heat with the cooking medium, however that recipe is very difficult to get right as to duration and final quality of the cooking: if cooking is allowed to continue for too long (for a large piece of fish), then everything cools down quickly, and if it is not allowed to go on long enough, then cooking can be insufficient. The increasing attraction of fish, in particular with improved distribution means, makes it particularly advantageous to have a method of preparation that is adapted to providing control over the cooking cycle.

Finally, turning to frozen foods, food is often thawed, then heated, and where appropriate cooked in a microwave oven, which can require two or even three distinct modes of operation to be performed one after the other, thus making it difficult to control times and powers which vary from one appliance to another. The ability to control the cycle easily opens up the possibility of eating frozen foods of a quality looked-for by gourmets, without any compromises concerning freshness and cooking quality. The growth in frozen food distribution is very great, and improving methods of preparing it and making them easier will contribute to further increasing such development.

In all three cases, which are representative of the field of application of the invention but not exclusive, it is desired firstly to control the temperature at which the food is treated for heating and/or cooking purposes within a temperature range of 50° C. to 80° C., and secondly to facilitate implementation by occasional users without running the risk of performing the cooking method wrongly, and while allowing maximum freedom in the basic recipe.

The present invention proposes a method making it possible to achieve these objects, and also a kit for implementing the method, making it possible to determine and control accurately the amount of heat that is added for cooking purposes, while taking account of numerous parameters such as: the mass of food (liver, fish) that is to be cooked; the specific heat of the food and of the pot; the cooking temperature, and thus the desired degree of cooking; the kind of food; various heat losses; etc.

To this end, the method of the invention is characterized by the steps consisting in: a) i) measuring the mass of the food and placing said mass in a first receptacle forming a container; or ii) placing the food in a first receptacle and measuring the combined mass of the food plus the first receptacle; or iii) measuring the mass of the food; b) placing the food, optionally together with the first receptacle of step a) in a second receptacle; c) raising a liquid such as water to a predetermined temperature, and in particular boiling temperature; d) determining a particular quantity of said water at predetermined temperature, as a function of a pre-established relationship between the desired mean cooking temperature and the mass of the food or the combined mass of the food plus the first receptacle; e) taking the particular quantity of water as determined in this way and placing it inside the second receptacle, in thermal contact with the first receptacle over a major portion of the surface thereof; and f) allowing the food to cook for a predetermined length of time.

Said pre-established relationship includes as constants, in particular, the specific heat of the food and said predetermined temperature. It can also include the mass and the specific heat of the first receptacle.

The second receptacle may constitute a thermally insulated enclosure; in which case said pre-established relationship may also include, as a constant, the quantity of heat lost during the predetermined duration due to imperfect thermal insulation. If the second receptacle contains a lining made of a phase-change material, then said predetermined relationship may also include as constants the mass and the latent heat of the phase-change material.

The invention also relates to the possibility, for a food that is frozen, of implementing a cycle of thawing—heating to 60° C.—cooking at 60° C. by using a volume of liquid that is approximately double the volume required for reaching the temperature of 60° C. from an ambient temperature of 20° C.

The invention also provides a kit for implementing the method, comprising: optionally a first receptacle forming a container; a second receptacle; and a third receptacle forming a measuring jug, said third receptacle carrying at least one graduated scale constituting a graphical representation of said pre-established relationship for a desired cooking temperature, and preferably a plurality of graduations constituting respective graphical representations of said pre-established relationship for different desired cooking temperatures, and optionally for different foods.

Advantageously, the first and second receptacles are substantially similar in shape.

In particular embodiments, the second receptacle may contain a lining of phase-change material and/or may include means for forcing convection within the volume of gas inside the enclosure; and the first receptacle is advantageously provided with support legs suitable for leaving a gap between the bottom of the first receptacle and the bottom of the second receptacle into which the water contained in said second receptacle can penetrate and through which it can flow.

Implementations of the invention are described below with reference to the accompanying drawing.

FIG. 1 is a section through a particular embodiment of the invention in which a receptacle is provided enclosing a pot containing the food to be cooked (a liver in this example).

FIG. 2 shows the measuring receptacle of the kit for implementing the invention.

The description begins with the case of cooking a foie gras.

The invention is implemented as shown in FIG. 1 which shows a pot 10 (which is either a conventional pot, or any other analogous receptacle suitable both for cooking the food and for presenting it for eating, or else a special pot provided together with the other items of the kit of the invention, and having heat characteristics that are accurately known), which pot is closed by a lid 12. The pot contains the food 14 to be cooked, which is typically, as mentioned above, a foie gras, of a goose or a duck.

The pot is placed inside a receptacle 16, itself closed by a lid 18, with the receptacle and the lid being made of a thermally insulating material 20 firstly to avoid any loss of heat during cooking and secondly to avoid any excessive heating of the outside walls, thus making handling easy and without risk to the user.

The inside volume of the receptacle 16 must enable the pot 10 to be immersed without being covered. To enable a liver to be cooked in a pot of volume $f$, the inside volume of the receptacle 16 must exceed f+e liters (where $e$ is the volume of water added) by a factor of about 1.5. In practice, that amounts to using a receptacle 16 of volume that is about three times the maximum volume of the pot 10. In addition, in order to ensure good heat distribution, it is desirable for the receptacle 16 and the pot 10 to be of shapes that are substantially similar, geometrically.

The inside of the receptacle 16 may optionally be lined with a phase-change type material 22, as explained below, so as to assist in maintaining its inside temperature.

The receptacle 16 closed by its lid 18 thus forms a thermally insulated enclosure of accurately known heat characteristics which is filled with hot water 24, preferably boiling water (since its temperature is then accurately determined) up to a depth that is slightly less than that of the pot, so that the water comes into contact with the wall of the pot 10 and can impart heat thereto and thus to the liver 14 via the major part of the surface of the wall.

Practical implementation shows that a large quantity of heat is also transferred via the lid 12 because of the steam atmosphere that obtains in the top portion of the enclosure. Means such as a fan (not shown) may optionally also be provided to force convection within this volume of steam, thereby reinforcing heat exchange between the mass of water 24 and the top of the liver 14 via the volume of steam and the lid 12. By way of example, the fan may be integrated in the lid 18 and powered by a solar cell, thereby avoiding any need to provide an external power supply.

For the same reason, it is advantageous for the pot to be provided with support legs 25 suitable for leaving a gap between the bottom of the pot and the bottom of the receptacle, into which the water contained in the receptacle can penetrate and flow.

Given the mean specific heat of foie gras, the mass of foie gras to be cooked, the ambient temperature (the starting temperature of the foie gras before cooking), and the thermal characteristics of the pot, the principle of the invention consists in determining a quantity of boiling water which will enable thermal equilibrium to be reached at the desired temperature.

The mean specific heat $c$ of foie gras is about 0.5 calories per gram per degree Centigrade (cal.g$^{-1}$.°C.$^{-1}$), which value is used in this example, with the difference between goose liver and duck liver being hardly perceptible. The mean specific heat of the pot, generally made of glass or of earthenware, is in practice quite close to that of foie gras, and it is possible to make an approximation consisting in using calculations for heating the inside of the receptacle based on the combined weight of the liver plus the pot, possibly including a correction factor as determined by experience. The correction factor is taken into account by the graduations on the measuring receptacle as described below.

Since the mean specific heat of water is 1 cal.g$^{-1}$.°C.$^{-1}$, to raise a mass $m$ (in grams) to a temperature $t$ starting from an ambient temperature of 20° C., the quantity of water at 100° C. required is equal to: e=c.m(t-20)/(100-t), giving a volume of water in cm$^3$ as specified in the following table (where $m$ is the weight in grams of the pot plus the liver):

| t (° C.) | e (cm$^3$) |
|---|---|
| 50 | m × 0.30 |
| 55 | m × 0.39 |
| 60 | m × 0.50 |
| 65 | m × 0.65 |
| 70 | m × 0.85 |
| 75 | m × 1.10 |

The user can easily determine this quantity of water without performing any calculation by means of a measuring receptacle of the kind shown in FIG. 2, i.e. a receptacle 26 provided with handles 28, made of transparent or translucent material and carrying a plurality of scales 30 each corresponding to a specific cooking temperature, marked at 32, which is selected by the user as a function of the kind of liver (50° C. to 65° C. for duck liver, 60° C. to 75° C. for goose liver) and as a function of the desired degree of cooking. Depending on circumstances, when the pot is a conventional pot whose heat characteristics are unknown, each of the graduated scales indicates the combined mass of the pot plus the liver (possibly with a correction factor to take account of heat losses from the system, as explained below), or else, when the pot is a special pot provided together with the other items of the kit of the invention, and having heat characteristics that are accurately known each scale indicates the mass of the liver on its own. As a result, all the user needs to do is measure a weight, select a cooking temperature, fill the measuring receptacle with the quantity of boiling water (100° C.) indicated for those two parameters, and finally pour that quantity of boiling water into the receptacle 16.

The other essential factor for obtaining satisfactory cooking is to maintain the desired temperature throughout the duration of cooking.

In practice, the pot serves as a heat screen for the liver to protect it from excessive surface heating while the boiling water is being poured in and during the temperature stabilization stage, with excess heating then taking place essentially at the walls of the pot. In practice, no excessive cooking is observed at the periphery of the liver nor is insufficient cooking observed in the center of the liver as a result of this very brief transient stage, and it can be assumed that the system reaches thermal equilibrium almost immediately.

The time required to cook the liver depends on the mass that is to be cooked and on the recipe of each user, depending on whether the user is looking for taste qualities closer to those of raw liver or, conversely, closer to those of a potted liver (the amount of cooking also having an effect on the length of time the final preparation can be conserved after it has been prepared).

The total cooking time is thus part of the recipe, but in practice it does not exceed one hour for part-cooked foie gras preparations using large goose livers weighing 800 grams (g) to 900 g. Cooking time generally lies in the range 20 minutes to 45 minutes.

To ensure that the temperature does not drop by more than 5° C. during cooking (assuming that cooking lasts for one hour), it is necessary for the thermal conductivity (per unit length and in the range of temperatures under consideration) between the inside and the outside of the receptacle 16 to be less than $\gamma \leq (m.c+e)/720$ cal.s$^{-1}$, where $\gamma$ is determined as a function of the minimum values for $\underline{m}$ and $\underline{e}$ and as a function of the desired temperature. For example, for cooking at a temperature of 50° C. using a pot weighing 300 g (liver+receptacle), it is necessary for $\gamma \leq 0.25$ cal.s$^{-1}$.

If the thermal insulation of the receptacle 16 is less than that, then the quantity of water used for heating the pot needs to take into account a supplement $\underline{e'}$ for compensating heat losses, depending on cooking time $\underline{s}$ and on the desired final temperature, which supplement is equal to: $e'=\gamma.s/(100-t)$, i.e. for $\gamma=6$ cal.s$^{-1}$ and when cooking a pot weighing 750 g for a period of 30 minutes at 65° C., $e'=514$ g to be added to $e=490$ g, i.e. giving a total volume of about 1 liter.

By implementing these various factors, it is possible to maintain an equilibrium temperature that is substantially constant (typically to within ±5° C.) as is essential for satisfactory cooking.

In practice, after weighing the pot containing the liver, as prepared and seasoned quite freely depending on the user's own recipe, the user proceeds as follows, after determining the desired cooking temperature:

the pot 10 is placed in the receptacle 16 (possibly after being rapidly prior scalded);

the measuring receptacle 26 is filled with the quantity of boiling water (100° C.) indicated for the corresponding mass and cooking temperature;

that quantity of boiling water is transferred into the receptacle 16 and the lid 18 is closed;

cooking is allowed to take place for the selected length of time;

the pot 10 is removed from the receptacle 16 once cooking has been completed, with the pot then being allowed to cool down to ambient temperature before being placed in a refrigerator for a minimum of two to three days in order to allow the liver to mature after cooking in traditional manner.

In improved versions, the system of the invention can optionally be provided with special thermostatting systems, e.g. by providing a thermostatically-controlled electrical resistance element or any other controlled heater means enabling the desired constant temperature to be maintained.

Another method of thermostatic control that is advantageous because it requires no external electrical power supply consists in lining the inside of the receptacle 16 and optionally of the lid 18 with a phase-change material.

Such a material makes it possible to achieve temperature equilibrium between the energy restored by changing the phase of the material and the total energy lost by the receptacle. Such materials are described, for example, in WO-A-93/01250, which discloses various molecular "alloys" suitable for storing and restoring energy via phase transitions therein, generally between a solid and a liquid, but also and advantageously between a solid and a solid.

The method of the invention is then advantageously implemented as follows: the receptacle 16 is filled with water; heat is applied by putting the kit in an oven, thereby changing the phase of the material 22; the pot is put into the receptacle and the lid 18 is closed; cooking is allowed to take place for the time required; the pot is removed; and is then allowed to cool as before.

This method requires a fixed constant cooking temperature (the phase-change temperature) from one recipe to another and from one pot to another, and it can be advantageous for craft production in small quantities, e.g. in restaurants.

The quantity of phase-change material required for providing thermal regulation must be calculated as a function of the phase-change energy E which must be sufficient, during the cooking time, to raise the pot from ambient temperature to the desired temperature; thus, for ambient temperature at 20° C., the following equation must be satisfied: $M.E \geq c.m (t-20)$.

In this case, given the thermostatic effect, the temperature of the added hot water can be more approximate, by way of example it is possible to use hot tap water at about 60° C., since the exact cooking temperature is determined thermostatically.

Naturally, the use of the invention is not limited to the particular example described above.

The method of the invention can thus be used for cooking some other food such as fish, providing that the pre-established relationship takes account of the specific heat of the food to be cooked. This depends on the nature of the food, and needs to be determined with satisfactory accuracy for each family of foods.

It is also possible to start with frozen food, typically conserved at a temperature of not less than −18° C., and more generally around −20° C.

To go from that temperature to +60° C., it is necessary to use exactly twice as much liquid as is required for going from 20° C. (common ambient temperature in a kitchen) to +60° C.

It is therefore easy using the method of the invention to heat frozen foods, and indeed to cook them, by keeping them at the equilibrium temperature for a sufficient length of time.

I claim:

1. A method of cooking food at a desired mean cooking temperature comprising the steps of:

a) measuring the mass of the food and placing said food in a first receptacle forming a container;

b) placing the food together with the first receptacle in a second receptacle;

c) heating a liquid to a predetermined temperature;

d) determining a quantity of said liquid at said predetermined temperature, as a function of a pre-established relationship between the said desired mean cooking temperature and the mass of the food;

e) placing said quantity of liquid inside the second receptacle, in thermal contact with the first receptacle; and f) cooking the food for a predetermined length of time, wherein said food is cooked by heat transfer between the liquid, the first receptacle and the food.

2. The method of claim 1, in which said pre-established relationship includes as constants the specific heat of the food and said predetermined temperature.

3. The method of claim 2, in which said pre-established relationship also includes as constants the mass and the specific heat of the first receptacle.

4. The method of claim 1, in which the second receptacle constitutes a thermally-insulated enclosure.

5. The method of claim 4, in which said pre-established relationship also includes as a constant the quantity of heat lost during the predetermined length of time.

6. The method of claim 2, in which the second receptacle contains a lining (22) of phase-change material, and said pre-established relationship also includes as constants the mass and the latent heat of the phase-change material.

7. The method of claim 1, in which, for the food that is frozen, a cycle of thawing—heating to 60° C.—cooking at 60° C. is implemented by using an additional quantity of liquid that is approximately equal to a quantity of liquid for reaching the temperature of 60° C. from an ambient temperature of 20° C.

8. The method of claim 1, wherein said liquid is water and said predetermined temperature is boiling temperature of said water.

9. The method of claim 1, wherein said food comprises foie gras.

10. A method of cooking food at a desired mean cooking temperature comprising the steps of:

a) measuring the mass of the food;

b) placing said food in a first receptacle forming a container within a second receptacle;

c) heating a liquid to a predetermined temperature;

d) determining a quantity of said liquid at said predetermined temperature, as function of a pre-established relationship between the said desired mean cooking temperature and the mass of the food;

e) placing said quantity of liquid inside the second receptacle, in thermal contact with the first receptacle; and f) cooking the food for a predetermined length of time, wherein said food is cooked by heat transfer between the liquid, the first receptacle and the food.

11. The method of claim 10, wherein said pre-established relationship includes as constants the specific heat of the food and said predetermined temperature.

12. The method of claim 11, wherein said pre-established relationship further includes as constants the mass and the specific heat of the first receptacle.

13. The method of claim 10, wherein said liquid is water and said predetermined temperature is boiling temperature of said water.

14. The method of claim 10, wherein said food comprises foie gras.

15. A method of cooking food at a desired mean cooking temperature comprising the steps of:

a) placing the food in a first receptacle forming container and measuring the combined mass of the food plus the first receptacle;

b) placing the food together with the first receptacle in a second receptacle;

c) heating a liquid to a predetermined temperature;

d) determining a quantity of said liquid at said predetermined temperature, as function of a pre-established relationship between the said desired mean cooking temperature and the combined mass of the food plus the first receptacle;

e) placing said quantity of liquid inside the second receptacle, in thermal contact with the first receptacle; and f) cooking the food for a predetermined length of time, wherein said food is cooked by heat transfer between the liquid, the first receptacle and the food.

16. The method of claim 15, wherein said pre-established relationship includes as constants the specific heat of the food and said predetermined temperature.

17. The method of claim 15, wherein said liquid is water and said predetermined temperature is boiling temperature of said water.

18. The method of claim 15, wherein said food comprises foie gras.

* * * * *